United States Patent [19]
Thompson et al.

[11] Patent Number: 5,526,362
[45] Date of Patent: Jun. 11, 1996

[54] CONTROL OF RECEIVER STATION TIMING FOR TIME-STAMPED DATA

[75] Inventors: Stephen M. Thompson, North Kingstown, R.I.; Karen Brim, Leominster, Mass.; Lewis Kenyon, Nashua, N.H.; Hassan Ahmed, Westwood, Mass.

[73] Assignee: Telco Systems, Inc., Norwood, Mass.

[21] Appl. No.: 414,372

[22] Filed: Mar. 31, 1995

Related U.S. Application Data

[63] Continuation-in-part of Ser. No. 220,975, Mar. 31, 1994.
[51] Int. Cl.$^6$ .................................................. H04J 3/06
[52] U.S. Cl. ........................... 370/105.3; 370/100.1; 375/371; 375/376
[58] Field of Search .................................. 370/100.1, 103, 370/105.3, 60, 60.1, 94.1; 375/371, 372, 373, 376

[56] References Cited

U.S. PATENT DOCUMENTS

| | | | |
|---|---|---|---|
| 4,811,340 | 3/1989 | McEachern et al. | 375/372 |
| 5,260,978 | 11/1993 | Fleisher et al. | 375/371 |
| 5,272,728 | 12/1993 | Ogawa | 375/372 |
| 5,367,545 | 11/1994 | Yamashita et al. | 375/372 |
| 5,396,492 | 3/1995 | Lien | 370/60 |

*Primary Examiner*—Douglas W. Olms
*Assistant Examiner*—Ajit Patel
*Attorney, Agent, or Firm*—Wolf, Greenfield & Sacks

[57] ABSTRACT

The invention provides a method and apparatus for controlling the timing at a receiving station for the receipt of asynchronous data transmitted with a time-stamp. The received data is passed through a buffer to the remainder of the station. A decoder at the receiving station generates an indication of buffer fill level and a local time-stamp is also generated. The output timing for the buffer is controlled by a circuit which is responsive to both a difference value off, received and locally generated time-stamps and to the fill level indication.

16 Claims, 1 Drawing Sheet

CONTROL OF RECEIVER STATION TIMING FOR TIME-STAMPED DATA

RELATED APPLICATION

This application is a continuation-in-part of application Ser. No. 08/220,975 filed Mar. 3, 1994, the contents of which are incorporated herein by reference.

FIELD OF THE INVENTION

This invention relates to a method and apparatus for controlling the timing at a receiving station for the passage into the station of asynchronously received data transmitted with a time-stamp, and more-particularly to such a method and apparatus which utilizes both the received time-stamp and the fill level of a smoothing buffer to control such timing.

BACKGROUND OF THE INVENTION

In digital transmission systems such as those described in the parent application, and in particular in packet transmission systems such as those operating in asynchronous transfer mode (ATM), there may be slight differences in timing between a transmitting station and a remote receiving station, which differences can result in a perceptible degradation in the received data. In order to faithfully re-establish the transmitted timing at a receiving station to which data has been directed, a time-stamp is sometimes included with the data, such time-stamp being an indication of the frequency difference between the incoming signal and a local clock derived from a central system clock which the transmitting and receiving stations share. Such time-stamps may, for example, be generated for systems operating in ATM in accordance with Bellcore specification TA-NWT-00113, with the resulting time-stamp sometimes being referred to as the synchronous residual time-stamp (SRTS).

While systems for putting a time-stamp on each data packet being routed through a transmission system are known, simple and efficient ways for retrieving and utilizing the time-stamp to synchronize the receiving station are less well known. Further, since in ATM and other packet-based data transmission techniques the data is received asynchronously, it is desirable that a buffer, for example a FIFO (i.e., first-in first-out) buffer, be provided between the incoming line and the remainder of the receiving station to smooth the received data. Optimally, this buffer is maintained at a selected fill level, for example approximately half full, so as to be able to continuously output at a lower speed the high speed asynchronously received input packets without loss of data due to buffer underflow or overflow.

One potential problem is that time-stamps may be missing for some reason, causing the buffer to "walk" (i.e., the buffer will either become overfilled or will empty preventing the smooth flow of data into the receiving station). This can cause aberrations in the received data and could result in received data being lost. A time-stamp may be missing from received data either because the time-stamp for some reason did not get added to the data at the transmitting station, the time-stamp somehow got lost in the transmission, the time-stamp was missed at the receiving station, or one or more data packets are not received at the receiving station. In any of these events, it is desirable that appropriate remedial action be taken at the receiving station to maintain an acceptable fill level in the buffer and to maintain an acceptable output rate for data from the buffer into the remainder of the receiving station.

SUMMARY OF THE INVENTION

In accordance with the above, this invention provides a method and apparatus for controlling the timing at a receiving station for the receipt of asynchronous data transmitted with a time-stamp. The received data is passed through a buffer to the remainder of the station. A decoder or other suitable means at the receiving station generates an indication of the buffer fill level, and a local time-stamp is also generated. The output timing for the buffer is controlled by a circuit or other suitable means which is responsive to both a difference value of received and locally generated time-stamps and to a fill level indication related to the buffer fill level. The fill level indication is preferably proportional to the difference between the current fill level of the buffer and a selected optimum fill level, for example roughly half full. This difference between current and optimum fill level may be modified by a selected centering error gain to generate a final error or fill level indication. The centering error gain can control the selection of optimum fill level and the effect of deviations from this optimum fill level on buffer output rate. The difference value may be obtained by generating a first difference between the currently received time-stamp and the last received time-stamp, a second difference between the current locally generated time-stamp and a previously generated local time-stamp, and generating a third difference which is the difference between the first and second differences.

The buffer is preferably a FIFO buffer and the control of output timing for the buffer is preferably done by a phase locked loop (PLL). For a preferred embodiment, the output from the PLL is obtained from a numerically controlled oscillator. The control input to the oscillator is preferably obtained from a phase detector which compares the received time-stamp error term-and current buffer fill indication as one set of inputs and the locally generated time-stamp and optimum buffer fill level as the other set of inputs.

The foregoing and other objects, features and advantages of the invention will be apparent from the following more particular description of a preferred embodiment of the invention as illustrated in the accompanying drawings.

IN THE DRAWINGS

DETAILED DESCRIPTION

Figure 1:
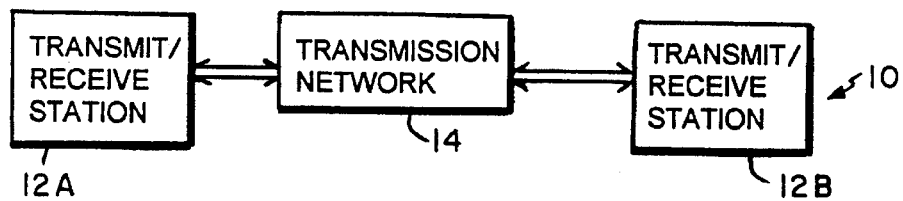
FIG. 1 is a schematic block diagram of a system in which the teachings of this invention may be utilized.

Referring first to FIG. 1, an illustrative system 10 is shown which includes remote stations 12A and 12B, each of which may either transmit or receive data, with a transmission network 14 interconnecting the remote stations. Transmission network 14 may, for example, be a telephone network and, as described in much greater detail in the parent application, there may be a large number of control units, end offices, central offices and the like between a given pair of stations 12, which stations may be located thousands of miles apart. However, the invention is not limited to telephony systems and might also be employed with other types of communications networks, such as cable networks, for connecting remote IO stations or terminals.

For networks providing constant bit rate services to its users, information, "bits", can not be long stored or borrowed. The frequency information that leaves a network element at a receiving or destination station must be made exactly equal to the frequency which the information entered the network element at the source or transmitting station. As indicated earlier, modern telecommunications networks often provide a network timing reference which can be used to derive internal reference signals. However, not all signals that enter the network are derived from this system timing reference. When the source and destination network elements share a common network clock, it is customary for a time-stemp to be included with the data, such time-stamp being an indication of the frequency difference (error) between the incoming signal from the source station and the network timing reference. For systems operating in ATM, such time-stamps may be generated in accordance with Bellcore specification TA-NWT-00113, the time-stamp in such case being referred to as the synchronous residual time-stamp (SRTS). However, for simplicity in the following discussion, the time-stamp will be referred to either as "time-stamp" or the letters "TS" may be utilized.

Figure 2:
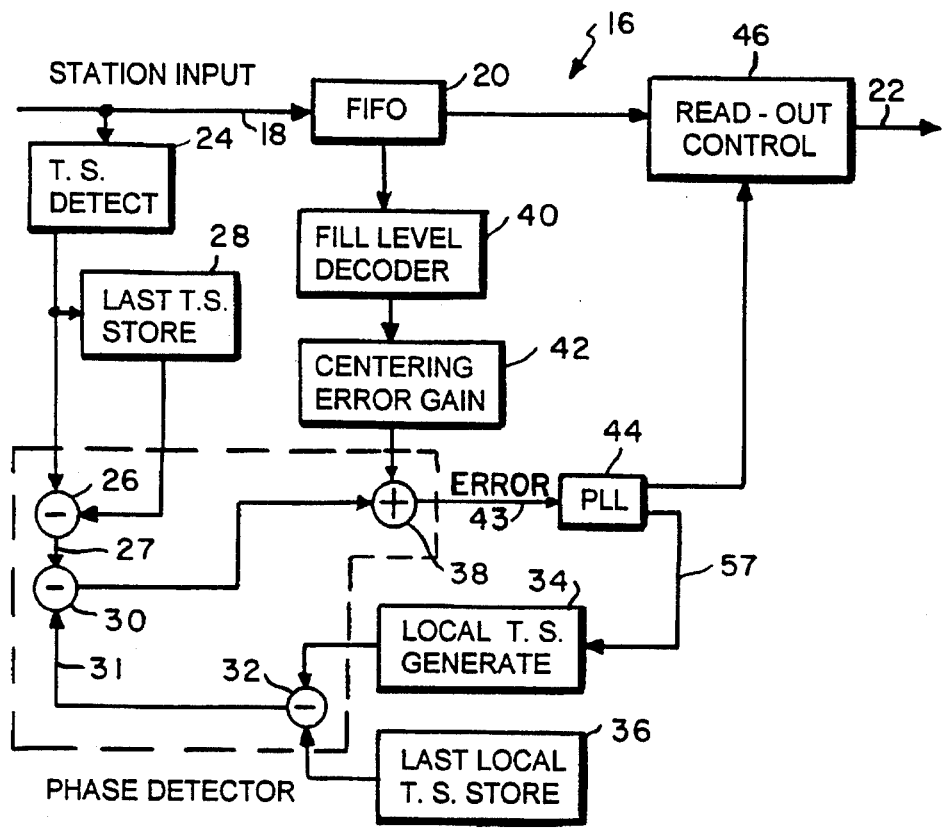
FIG. 2 is a schematic block diagram of a circuit for controlling timing at a receiving station in accordance with the teaching of this invention.

FIG. 2 is a block diagram of a circuit 16 which may be used at each station 12 for retrieving and utilizing the time-stamp on asynchronously received packeted data such as that provided for ATM operation. Data received on the station's input lines 18, which may for example be byte parallel, are stored in a FIFO memory buffer 20. Buffer 20 is intended to match (rate de-couple) the high speed received data coming in on lines 18 with a continuous lower speed demand for data on output lines 22 from circuit 16 which lines lead into utilization equipment at station 12. Such equipment may, for example, include video displays, a smooth flow of data into the display device being desirable to prevent aberrations from appearing in the display. In order for the FIFO buffer 20 to operate properly, the buffer should never be empty so that it has no data to provide to its utilization device, and the buffer should never be full so that incoming data can not be stored, which could result in the loss of data. Therefore, in most situations, it is desirable that the buffer be maintained roughly half full, although the optimum fill level for the buffer will vary with application, and can be programmed for a given application.

Input lines 18 are also applied to a time-stamp detect circuit 24. Time-stamps may be detected by looking for time-stamp bits at selected locations in each packet of data, or by other techniques known in the art. When a time-stamp is detected in the input, it is applied as one input to a subtractor 26, the other input to which is obtained from a register or other suitable storage device 28 in which the last received time-stamp is stored. Once the differencing operation in subtractor 26 has been completed, the new time-stamp detected by circuit 24 is stored in store 28.

The output from subtractor 26 is applied as one input to subtractor or difference circuit 30. The other input to circuit 30 is the output from subtractor or difference circuit 32. One input to circuit 32 is the local time-stamp being generated at the receiving station 12. The circuitry 34 for generating such a time-stamp, which may be hardware, software, or a combination thereof, is known in the art and, as indicated earlier, is a function of the difference between the local clock and a standard system clock. The other input to circuit 32 is the output from last local TS store 36, which is a register or other suitable store for the local time-stamp which was generated during the preceding time step interval. Once circuit 32 generates an output, the new local time-stamp generated by circuit 34 is transferred into and stored in store 36. Thus, while the output on line 27 from circuit 26 represents the frequency difference due to originating station or source timing variations, the output from circuit 32 on line 31 represents a frequency difference due to local timing variations at the receiving station. The output from difference circuit 30 is connected as one input to summing circuit 38. A fill level decoder 40 is provided which generates an output indicative of a fill level in FIFO 20. The magnitude of the output from decoder 40 is modified by a centering error gain circuit 42, the output from which is applied as the other input to summing circuit 38. The function of circuit 42 will be described later.

Figure 3:
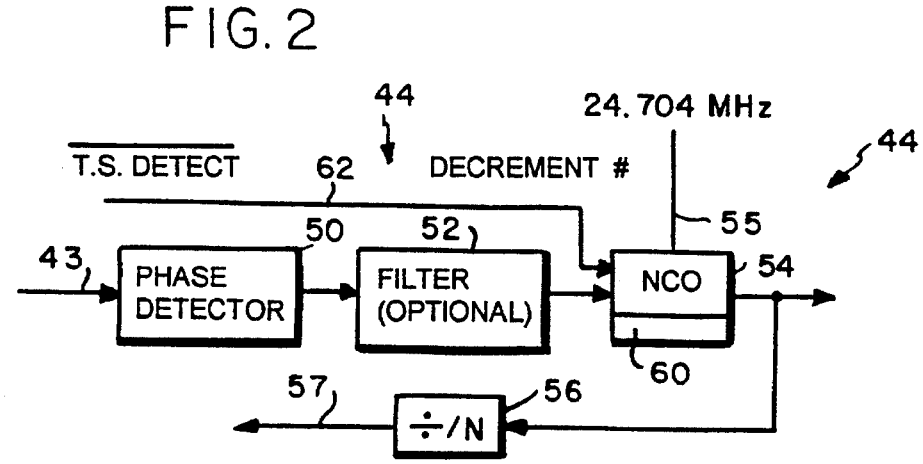
FIG. 3 is a schematic block diagram of a phased locked loop circuit suitable for use as the PLL circuit in FIG. 2.

Circuits 26, 30, 32 and 38 form a phase detector 50, with the output from summing circuit 38 on line 43 is an error signal which is applied to phase lock loop (PLL) 44. The output from PLL 44 is utilized to control or clock the reading out of data by readout control 46 from FIFO 20. In particular, referring to FIG. 3, the error output on line 43 from phase detector 50 is connected through a filter 52, which circuit is optional, for reasons to be discussed later, to the numerical control input of a numerically controlled oscillator (NCO) 54. The output from oscillator 54 is connected as a clocking input to read out control 46 and is also fed back through a divide-by-N circuit 56 to phase detector 50 such that the PLL is closed through the locally generated time-stamp. The locally generated time-stamp causes the PLL to look for a new received time-stamp in detector 24, this detector including a small FIFO. This accommodates variations in,the received time-step arrival. In normal operation, there is a one-to-one correspondence between received and locally generated time steps. As will be discussed later, should there be no new time-stamp when the PLL expects one (i.e.,FIFO empty), then that condition forces the NCO toward its nominal value (i.e., 24.704 MHZ/16). Finally, line 62, which has a signal on it when a time-stamp has not been detected for a given clock interval, is connected as a input to NCO 54.

For a preferred embodiment the output timing is obtained by first dividing a 24.704 MHZ oscillator signal applied to the NCO on line 55 by a value M (M being 15, 16, or 17 for the preferred embodiment) and dividing that result by N. 24.704 MHZ/M represents a single output clock cycle and 24.704 MHZ/M/N represents the number of output clock cycles between 2 time-stamps (i.e., 3008 clock cycles). Frequency adjustment is obtained by selecting, at more or less evenly spaced intervals, occurrences when M is changed from its nominal value of 16, to 15 in the case where data must be read out of the FIFO faster or to 17 where data must be read out of the FIFO slower. The number of occurrences where M is changed in one time-stamp interval is constrained between +10 and −9. This number is contained in an NCO accumulator register 60, with M being 17 for the indicated number of occurrences when a plus number is in register 60, M being 15 for the indicated number of occurrences when a negative number is in the register, and M always being 16 when the value in register 60 is zero. The NCO accumulator register is compared with the new error term as modified by filter 52, (i.e., the signal on line 59) and the result is reintroduced into accumulator register 60.

In operation, for the preferred embodiment shown in the figures, a complete time-stamp should be received and detected at circuit 24 after each 3008 clock cycles. At the same time that the time-stamp is being received and stored at detect circuit 24, a local time-stamp is also being generated by circuit 34. The newly received time-stamp is compared in circuit 26 against the last time-stamp which was received and the newly generated local time-stamp is compared in circuit 32 against the last local time-stamp which was generated. The difference outputs as a result of the comparisons in circuits 26 and 32 are applied to circuit 30, with the difference output from circuit 30 being the time-stamp error output for the given time interval.

This error signal is applied as one input to summing circuit 38. The coded FIFO fill level from circuit 40 is modified by centering error gain circuit 42 to form the other input to this summing circuit. The function of circuit 42 is to control how much the centering error influences the FIFO read out rate. For a preferred embodiment, it is desired that the read out rate be primarily controlled by the time-stamp error, and circuit 42 therefore attenuates the output from decoder 40, However, the gain characteristic of circuit 42 may vary with application to achieve any desired objective with respect to fill level for FIFO 20 and the PLL characteristics. For example, the circuit could assure that the FIFO will never become empty or full by amplifying the outputs when the FIFO approaches either of these conditions to make this the controlling factor in determining the readout rate from the FIFO. Further, the gain characteristic in circuit 42 can also permit any selected fill level in the FIFO to be the desired level for which no output is generated by circuit 42, with positive levels being generated above this value and negative values below.

The error signal on line 43 is applied to PLL 44. The resulting error signal is preferably filtered by filter 52 to slow down the response of oscillator 54 to input changes. This makes the output clock as smooth as possible, rendering the circuit less responsive to jitter or other noise introduced into the signal at the sending station in the transmission network or at the receiving station. The filtered error signal is then applied to NCO 54 to control the number stored in register 60, and thus the average read-out rate from the FIFO during its succeeding time stamp interval.

As discussed earlier, one potential problem with synchronizing on time-stamps is that a time-stamp may be lost for a variety of reasons, including the fact that a time-stamp was not provided on the data initially, the time-stamp was lost in transmission, detector 24 failed to detect a time-stamp on the data, or data itself is missing. The cumulative effect of such missing time-stamps can cause the FIFO buffer to walk, and may result in the buffer becoming empty or full. This problem is corrected by comparing the actual FIFO fill level to some threshold fill level. It is often desirable to force the output clock frequence toward its nominal frequency level, for example to facilitate PLL lock and capture characteristics, or to employ the nominal frequency as a source for alarm indication signal, (AIS). (AIS signals for the preferred embodiment must be held within 32 PPM). When a new time-stamp is not detected at the time a new local TS is generated, line 62 directs the NCO accumulator to increment or decrement toward O resulting a move toward nominal frequency from the NCO. In particular, if the count in register 60 is positive, the count is decremented by one count, while if the count in register 60 is negative, it is incremented by one count. Thus, in the absence of a time-stamp, the output clock frequency moves towards the nominal 1.544 MHz which is the output frequency of the NCO when the count in register 60 is zero.

The signal on line 62 may be derived in a variety of ways. For example, TS detector 24 may generate an output when a complete time-stamp is assembled therein. The absence of this output could produce the signal on line 62. Station 12 could also have circuitry for detecting a missing time-stamp or a missing data packet, with the output from these various detectors being ORed to provide the signal on line 62.

While the invention has been described above with reference to a preferred embodiment, it is apparent that the circuitry described is for purposes of illustration only and that other suitable circuitry for performing the various functions could be utilized. In particular, while special purpose circuitry is shown for performing various functions, a special purpose or programmed general purpose processor could be utilized to perform various ones of the function, or the functions could be performed by some combination of hardware and software.

Thus, while the invention has been particularly shown and described above with respect to a preferred embodiment, the foregoing other changes in form and detail may be made therein by one skilled in the art without departing from the spirit and scope of the invention.

What is claimed is:

1. A device for controlling the timing at a receiving station for the receipt of asynchronous data transmitted with a time-stamp comprising:

a buffer through which the received asynchronous data is passed;

a decoder for generating an indication of the buffer fill level;

a local time-stamp generator at the receiving station for providing locally generated time-stamps; and a circuit for controlling output timing for the buffer, said circuit being responsive to both a difference value of received and locally generated time-stamps and to an indication of fill level from said decoder.

2. A device as claimed in claim 1 wherein said fill level indication is proportional to the difference between the fill level of the buffer and a selected optimum fill level.

3. A device as claimed in claim 2 wherein the difference between current and optimum fill level is modified by a selected centering error gain to generate the fill level indication.

4. A device as claimed in claim 2 wherein said circuit includes means for generating a first difference between the time-stamp for the asynchronous data being received and the time-stamp for the most recent prior received asynchronous data, for generating a second difference between the locally generated time-stamp currently being generated and a previously generated local time-stamp, and for generating a third difference which is the difference between the first and second differences.

5. A device as claimed in claim 1 wherein the buffer is a FIFO buffer.

6. A device as claimed in claim 1 wherein the circuit includes a phase locked loop (PLL).

7. A device as claimed in claim 6 wherein an output from said PLL is obtained from a numerically controlled oscillator, a control input to the oscillator being a function of the time-stamp difference values and the fill level indication.

8. A device as claimed in claim 7 including means for indicating that a time-stamp is missing, and means responsive to said means for indicating for controlling the oscillator to move toward a selected nominal value, thereby preventing walking of the oscillator.

9. A device as claimed in claim 1 wherein said data is received in asynchronous packets, each of which packets includes a time-stamp, and wherein said buffer smooths out the received packets.

10. A method for controlling timing at a receiving station for the receipt of asynchronous data transmitted with a time-stamp comprising the steps of:

(a) passing the received data through a buffer;

(b) generating an indication of fill level for the buffer;

(c) generating a local time-stamp at the receiving station; and (d) controlling output timing for the buffer, said output timing being responsive to both a difference value of received and generated local time-stamps and to the generated indication of buffer fill level.

11. A method as claimed in claim 10 wherein step (b) includes the step of generating a fill level indication which is proportional to the difference between the fill level for the buffer and a selected optimum fill level.

12. A method as claimed in claim 11 wherein step (b) includes the step of modifying the difference between current and optimum fill level by a selected centering error gain to generate the fill level indication.

13. A method as claimed in claim 11 wherein step (d) includes the steps of generating a first difference between the time-stamp for the asynchronous data being received and the time-stamp for the most recent prior received asynchronous data, generating a second difference between the locally generated time-stamp currently being generated and a previously generated local time-stamp, and generating a third difference which is the difference between the first and second differences.

14. A method as claimed in claim 10 wherein step (d) is performed in a PLL, an output from said PLL being obtained from a numerically controlled oscillator, and including the step of generating a control input to the oscillator which is a function of the difference value and the fill level indication.

15. A method as claimed in claim 14 including the step, performed if a time-stamp is not received when due, of moving the oscillator toward a selected nominal value, thereby preventing walking of the oscillator.

16. A method as claimed in claim 10 wherein said data is received in asynchronous packets, each of which packets includes a time-stamp, and including the step performed by said buffer of smoothing out the received packets.

* * * * *